United States Patent
Matsumori et al.

(10) Patent No.: US 11,677,469 B1
(45) Date of Patent: Jun. 13, 2023

(54) OPTICAL POSITIONING-NAVIGATION-TIMING TRANSCEIVERS AND ASSOCIATED METHODS

(71) Applicant: BridgeComm, Inc., Denver, CO (US)

(72) Inventors: Barry Matsumori, Rolling Hills Estates, CA (US); Paul Searcy, Niwot, CO (US); Michael Morton Morrell, Frederick, CO (US); Ethan Earl Becker, Centennial, CO (US)

(73) Assignee: BridgeComm, Inc., Denver, CO (US)

( * ) Notice: Subject to any disclaimer, the term of this patent is extended or adjusted under 35 U.S.C. 154(b) by 0 days.

(21) Appl. No.: 17/483,674

(22) Filed: Sep. 23, 2021

Related U.S. Application Data

(60) Provisional application No. 63/082,451, filed on Sep. 23, 2020.

(51) Int. Cl.
  *H04B 10/118* (2013.01)
  *G01S 19/48* (2010.01)
  *H04B 10/40* (2013.01)

(52) U.S. Cl.
  CPC .......... *H04B 10/118* (2013.01); *G01S 19/485* (2020.05); *H04B 10/40* (2013.01)

(58) Field of Classification Search
  CPC ..... H04B 10/118; H04B 10/40; G01S 19/485; G01S 19/48; G01S 19/42; G01S 19/39; G01S 19/38
  USPC ........................................................ 398/121
  See application file for complete search history.

(56) References Cited

U.S. PATENT DOCUMENTS

| | | | |
|---|---|---|---|
| 9,070,236 B1 * | 6/2015 | DiEsposti | G01C 21/20 |
| 11,336,373 B2 * | 5/2022 | Khachaturian | H04B 10/40 |
| 11,445,373 B1 * | 9/2022 | O'Connor | H04W 12/06 |
| 2002/0012150 A1 * | 1/2002 | Willebrand | H04B 10/2912 |
| | | | 398/141 |
| 2002/0131121 A1 * | 9/2002 | Jeganathan | H04B 10/1127 |
| | | | 398/118 |
| 2004/0001720 A1 * | 1/2004 | Krill | H04B 7/18508 |
| | | | 398/121 |
| 2015/0349881 A1 * | 12/2015 | Byers | H04B 10/07955 |
| | | | 398/118 |
| 2019/0296802 A1 * | 9/2019 | Fang | H04B 7/1851 |
| 2019/0317220 A1 * | 10/2019 | Kocer | G01S 19/46 |
| 2019/0393956 A1 * | 12/2019 | Kolev | B64G 3/00 |

* cited by examiner

*Primary Examiner* — Dalzid E Singh
(74) *Attorney, Agent, or Firm* — Neugeboren O'Dowd PC

(57) ABSTRACT

An optical positioning-navigation-timing (PNT) system includes a managed optical communications array (MOCA) transceiver. The MOCA transceiver includes an array of optical transceivers for transmitting and receiving optical signals, each optical transceiver including a laser and a beam steering element, and a controller for controlling the operation of the array of optical transceivers. Each optical transceiver is adjustable for optical parameters of the optical signals so transmitted and received, the optical parameters including at least one of phase, angle, wavelength, time delay, amplitude, pulse delay, polarization, timing offset, phase, and divergence angle. Further, the controller is configured for controlling the optical parameters to include PNT data in a portion of the optical signal transmitted from the MOCA transceiver.

6 Claims, 7 Drawing Sheets

US 11,677,469 B1

OPTICAL POSITIONING-NAVIGATION-TIMING TRANSCEIVERS AND ASSOCIATED METHODS

RELATED APPLICATIONS

This application claims priority to U.S. Provisional Patent Application Ser. No. 63/082,451, titled "Optical Positioning-Navigation-Timing Transceivers and Associated Method," filed Sep. 23, 2020, which application is incorporated herein in its entirety by reference.

FIELD OF THE INVENTION

The present invention relates to optical communications and, more particularly, to optical communication transceivers capable of providing positioning-navigation-timing (PNT) data.

BACKGROUND OF THE INVENTION

Many modern communication devices rely on PNT data for operation. In the United States, the Global Positioning System (GPS), operated by the U.S. Air Force, is the primary provider of PNT data. GPS consists of a core constellation of 24 satellites at medium Earth orbit (MEO), providing radio signals with PNT data to military and civilian users on Earth. Other Global Navigation Satellite Systems (GNSS), such as BeiDou in China, Galileo in Europe, GLONASS in Russia, and QZSS in Japan, are available to provide enhanced coverage at specific locations around the world.

While GPS and other RF-based PNT systems nominally provide worldwide coverage at all times, the system is still prone to outages due to, for example, satellite malfunction, interference, and jamming. Further, the performance of GPS and other PNT systems is limited at high latitude locations on the globe, since multiple satellites are required for location fixes and, for RF-based PNT systems, it is difficult at high latitude locations to obtain coverage by more than one PNT system satellite. Also, cold/warm startup times can take several minutes, which can be debilitating for applications requiring fast responses. Such deficiencies have immediate repercussions on industries ranging from financial institutions, media, and military.

SUMMARY OF THE INVENTION

In accordance with the embodiments described herein, an optical positioning-navigation-timing (OPNT) system for providing optical transmission of positioning-navigation-timing (PNT) data described. The OPNT system can be used alone or in combination with existing RF-based PNT systems, and provide advantages beyond RF-based PNT systems.

An associated method for using an optical positioning-navigation-timing (OPNT) system is also described.

In an embodiment, an optical positioning-navigation-timing (PNT) system includes a managed optical communications array (MOCA) transceiver. The MOCA transceiver includes an array of optical transceivers for transmitting and receiving optical signals, each optical transceiver including a laser and a beam steering element, and a controller for controlling the operation of the array of optical transceivers. Each optical transceiver is adjustable for optical parameters of the optical signals so transmitted and received, the optical parameters including at least one of phase, angle, wavelength, time delay, amplitude, pulse delay, polarization, timing offset, phase, and divergence angle. Further, the controller is configured for controlling the optical parameters to include PNT data in a portion of the optical signal transmitted from the MOCA transceiver.

In another embodiment, the optical PNT system further includes a mounting mechanism for mounting the MOCA transceiver on at least one of a ground station, a ground vehicle, an aircraft, a marine vessel, and a satellite.

In yet another embodiment, the optical PNT system is hosted as a payload on a satellite. In a further embodiment, the satellite is one of a Global Positioning System (GPS) satellite, a BeiDou satellite, a Galileo satellite, a GLONASS satellite, an IRNSS/NavIC satellite, and a QZSS satellite.

In an embodiment, a method for using an optical positioning-navigation-timing (PNT) system includes providing an optical PNT system including a managed optical communications array (MOCA) transceiver. The method further includes, at the optical PNT system, receiving a request for PNT data from a requester, determining parameters for an optical signal containing the PNT data, and using the MOCA transceiver, sending the optical signal containing the PNT data to the requester.

In a further embodiment, the method further includes, in the optical signal, including instructions to return a confirmation to the optical PNT system when the optical signal containing the PNT data at the requester.

In still further embodiment, sending the optical signal containing the PNT data includes sending multiple optical signals toward the requester, the multiple optical signals differing from each other in at least one of phase, angle, wavelength, time delay, amplitude, pulse delay, polarization, timing offset, phase, and divergence angle.

DETAILED DESCRIPTION OF EMBODIMENTS OF THE INVENTION

Figure 1:
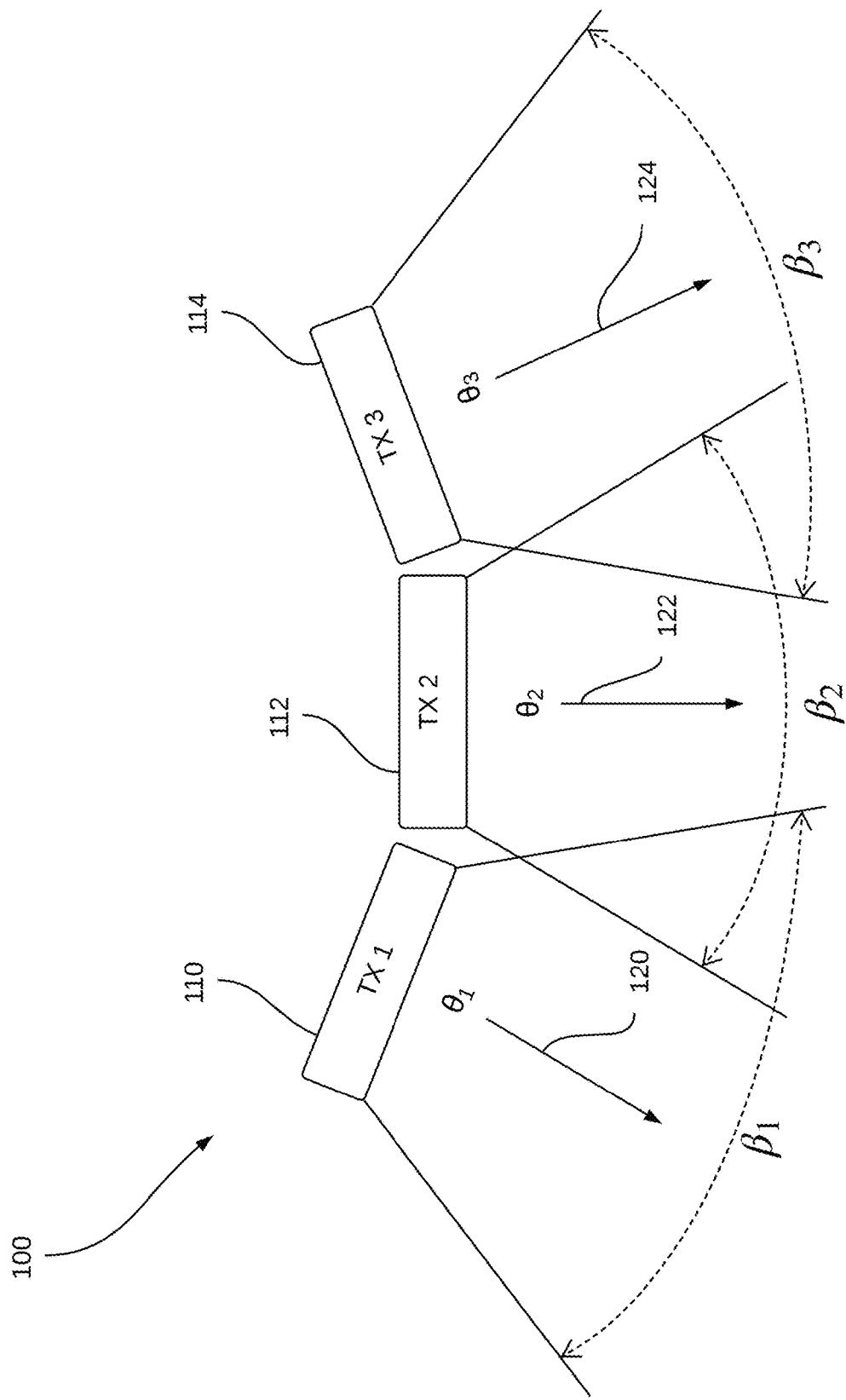
FIG. 1 illustrates an exemplary transceiver arrangement suitable for use with the optical positioning-navigation-timing (OPNT) system, in accordance with an embodiment, as described herein.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Optical transmitters or transceivers can provide PNT data much more efficiently than traditional RF-based PNT systems. For example, optical transmitters allow distribution of the PNT data packet in one or a few packets, where additional packets would allow for extra averaging and higher accuracy. Also, optical transmitters can specify the directionality of data transmission, unlike RF-based PNT systems, thus allowing aiming of specific PNT data to specific users. Furthermore, new technologies, such as a Managed Optical Communication Array (MOCA) transceiver with multiple sub-transceivers (disclosed in co-pending U.S. Provisional App. Ser. No. 62/985,437 filed on 5 Mar. 2020 and 63/053590 filed on 18 Jul. 2020), provide additional flexibility to free space optical communication (FSOC) systems, alone or in combination with RF systems. FSOC systems, such as those using MOCA transceivers, can provide essentially non-disruptive system design that can provide flexible and encoded PNT data quickly and more efficiently than GPS. Additional advantages of using FSOC systems with MOCA transceivers to communicate PNT data include, and are not limited to:

1. Ability to obtain complete four dimensional PNT information (i.e., X-, Y-, and Z-coordinates plus time) using a single satellite;
2. High latitude position fix (i.e., even at global locations where only a single satellite is visible);
3. Fast startup time from cold and warm starts;
4. Providing initial location data from a single beam, without doing multiple fix calculations;
5. Higher accuracy than RF GPS due to focused beam and the ability to combine data from multiple beams;
6. Impervious to RF interference
7. Ability to control beam width (i.e., providing a variable divergence angle for the transmitted light beam) to control who receives specific PNT data (e.g., narrow beam for private delivery to a few users, broad beam for larger set of users)

A system of MOCA sub-transceivers generally includes an array of optical transceivers, including a laser, a beam steering element (e.g., one or more of a liquid crystal beam steerer and a fine steering mirror) and other components to control the transmitted laser beam. The MOCA sub-transceiver system also includes firmware to control the individual transceivers and the overall array of transceivers, as well as firmware to control the information transfer to the target receiver or transceiver.

An example of a transceiver with multiple MOCA sub-transceivers is shown in FIG. 1. The MOCA sub-transceivers can be fixedly located on a surface that may be planar or curved. As shown in FIG. 1, optical transceiver 100 is designed with a low profile to allow three sub-transceivers 110, 112, and 114 (i.e., TX1, TX2, and TX3, respectively) to be mounted pointing at different angles ($\theta_1$, $\theta_2$, and $\theta_3$, respectively) as indicated by arrows 120, 122, and 124, respectively. This configuration allows the overall transceiver to send and receive signals over a larger field of view without a need to mechanically move the transceiver. For example, a desired field of view is covered by $\theta_1$ to $\theta_3$, represented by the overlapping angle ranges $\beta_1$, $\beta_2$, $\beta_3$, such that the transceiver does not need to be mechanically translated in order to enable optical communication over the desired field of view. As another example, only a portion of the desired field of view is covered by $\theta_1$ to $\theta_N$, and a mirror, gimbal, piezoelectric motor, or other mechanical or optical arrangement can be used to cover the remainder of the desired field of view by providing a motion that is equal to or greater than $\theta_1$ to $\theta_3$. That is, if sub-transceiver 110 is oriented at $\theta_1$, and a single transceiver can access a full range of $\beta_1$, then transceiver can access $\theta_1 \pm \frac{1}{2}\beta_1$. As the range β for the MOCA sub-transceiver can be on the order of 90-degrees or more, the MOCA sub-transceivers can steer light signals far beyond a field of view that is accessible using RF signals.

In other words, by using multiple sub-transceivers, with the possibility of overlapping (partially or completely) outputs, and parallel optical paths, additional functionality can be integrated into the overall network operations. In another example, each one of sub-transceivers 120, 122, and 124 is configured to send and/or receive signals with different beam parameters. For instance, each one of sub-transceivers 120, 122, and 124 can be configured to transmit an optical signal at a different frequency and/or polarization from each other sub-transceiver.

Figure 2:
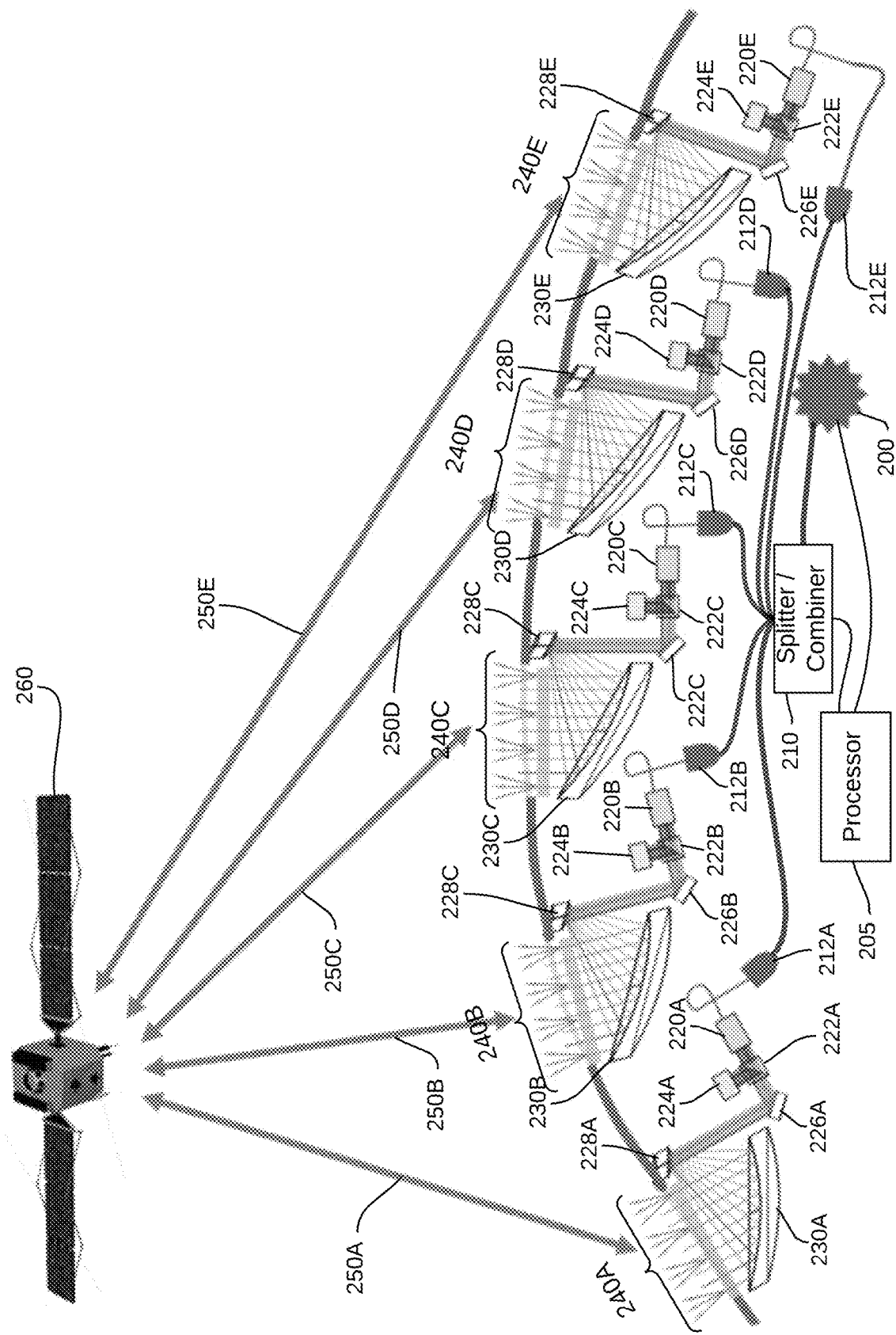
FIG. 2 shows an implementation of an exemplary transceiver arrangement suitable for use with the OPNT system herein described, in accordance with an embodiment.

An example of an implementation of multiple MOCA transceivers, each including an array of sub-transceivers, is shown in FIG. 2. FIG. 2 shows transceiver system 200 controlled by a processor 205. Processor 205 also controls a node (or splitter) 210 as well as delay systems 212A-212E. After being processed through each of delay systems 212A-212E, in the example illustrated in FIG. 2, the optical signal emerging from each transceiver system is transmitted through a fiber link 220, a beam splitter 222, a position sensitive detector (PSD) 224, reflected from a fast-steering mirror (FSM) 226 and turning mirror 228, and a curved mirror 230 to produce a plurality of rays 240. Each of fiber links 220A through 220E, beam splitters 222A through 222E, PSDs 224A through 224E, FSMs 226A through 226E, turning mirrors 228A through 228E, and curved mirror 230 can be identical to each other or set up with different configurations from each other. Plurality of rays 240A-240E emerging from each of transceiver systems establish separate communication channels 250A-250E, respectively, with a faraway target (shown in FIG. 6 as a satellite 260).

By controlling the variety of components shown in FIG. 2, processor 205 controls each the phase, angle, wavelength, time delay, and amplitude of the plurality of rays 240A-240E. That is, each sub-transceiver within transceiver system 200 is instructed by processor 205 to transmit, or not transmit, an optical beam having a specifically defined wavelength, pulse delay, polarization, timing offset and phase during a given transmit period. This selective approach to improving the specific parameters of the optical signal beam allow high data connections by increasing the data rate and reducing the bit error rate (BER) in a highly granular, dynamic loop.

While the MOCA transceiver array embodiments of FIGS. 1 and 2 are shown as being deployed on the ground to communicate with satellites in space, the MOCA transceiver array can also be deployed at the satellite as a dedicated satellite or as a hosted payload. As discussed in co-pending provisional applications, the MOCA transceiver array can also be flexibly installed on vehicles, aircraft, marine vessels, and other fixed and movable objects.

By dedicating a portion of the FSOC system based on the MOCA transceiver array to transmission of PNT data, the FSOC system can be used to independently provide PNT data more quickly and securely than existing GPS, or work with the existing GPS infrastructure to provide enhanced functionality. For instance, the MOCA transceiver array allows control over the size of the light beam used to transmit the PNT data. In an example, a narrow beam from a satellite containing a MOCA transceiver array can be used to transmit a narrow and directed beam for private transmission of PNT data to a limited number of users. In another example, a broad beam can be used to transmit PNT data to a larger number of users. Alternatively, specific one or more of the transceivers in the MOCA transceiver array can be used to transmit PNT data to specific users, while other ones of the transceivers in the MOCA transceiver array can be used to transmit other PNT data to other users. That is, the same MOCA transceiver array can be used to direct different information to different users.

Further, by using multiple ones of the transceivers in the same or multiple MOCA transceiver arrays can be used to further increase the accuracy of the position data by internally triangulating between multiple transceivers. Additionally, while certain transceivers in the MOCA transceiver array can be dedicated to PNT data transmission, the remaining transceivers can be used for more complex tasks, such as more general optical communication data transmission. As optical communication bandwidth is broader than RF communication bandwidth, the broader bandwidth can be used to enable a more robust error correction mechanism than is available with GPS, thus increasing the quality of service (QoS) for FSOC PNT data transmission. For example, the use of Forward Error Correction with encoding scheme using large amounts of repeat packets can increase the QoS of FSOC PNT data transmission. Additionally, since the MOCA transceiver array can operate in a two-way mode, in contrast with GPS satellites that only operate one-way, uplink channels to the MOCA transceiver array can be used to provide additional security and data verification.

Figure 3:
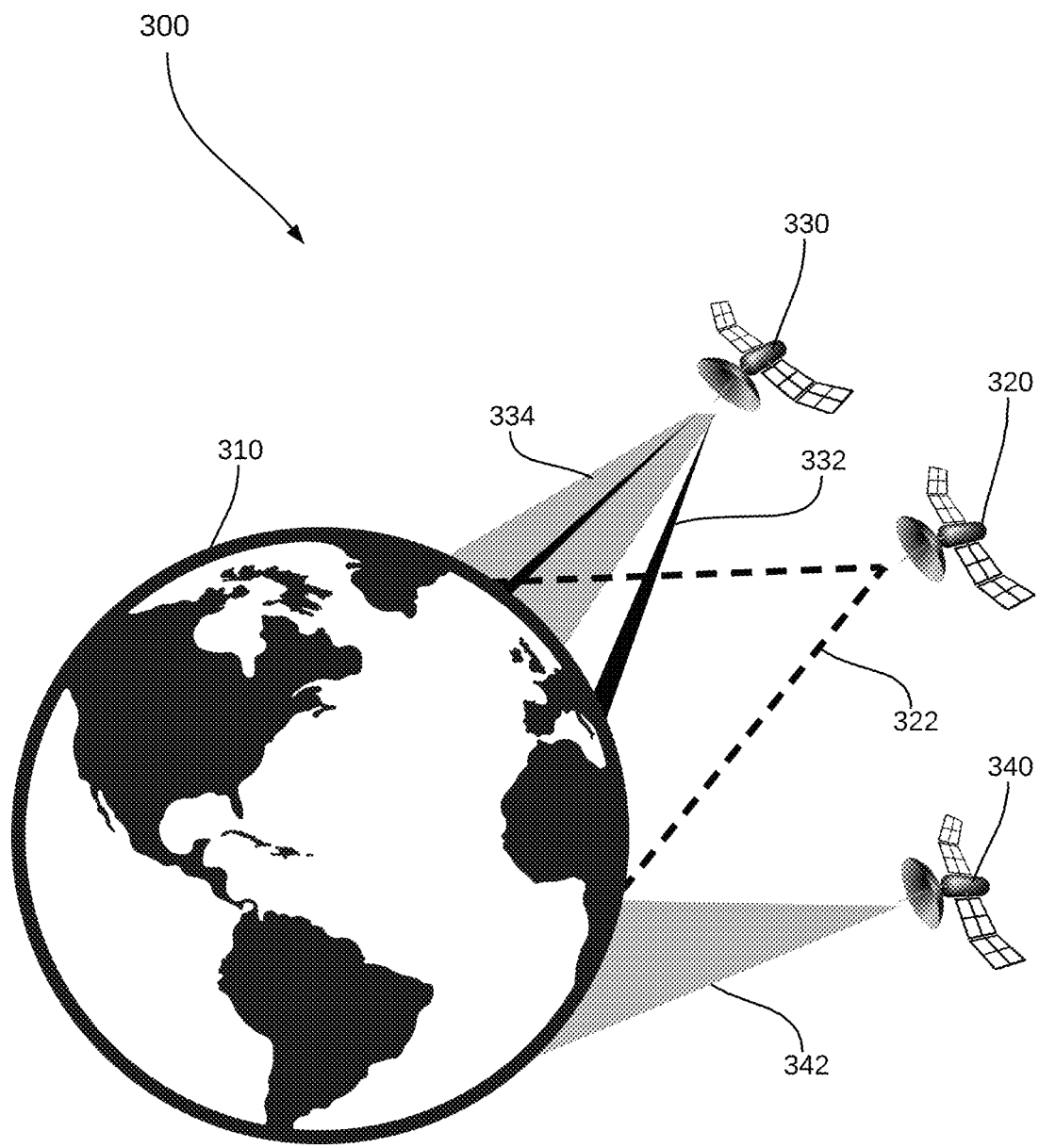
FIG. 3 shows an OPNT system including several satellites integrating the capabilities of both RF and optical communication-based satellites, in accordance with an embodiment.

FIG. 3 shows an OPNT system 300 including several satellites in the constellation flying around Earth 310, in accordance with an embodiment. OPNT system 300 includes a traditional RF-based GPS satellite 320, which transmits RF signals containing PNT information over a broad swath of area 322, indicated by a dashed cone. Area 322 is generally fixed and quite broad, intended to cover a large area of Earth 310.

Continuing to refer to FIG. 3, OPNT system 300 also includes first and second MOCA satellites 330 and 340, respectively. The MOCA satellites can interwork with traditional RF-based GPS satellite 320 to provide higher accuracy at the ground terminal as well as additional capabilities to enhance the performance of the overall GPS. For instance, as shown in FIG. 3, first MOCA satellite 330 flexibly transmits optical signals containing PNT information over first, narrow areas 332, or over a second, broader area 334, as indicated by hatched cones. Thus, first MOCA satellite 330 can provide overlapping PNT data transmission coverage with GPS satellite 320. In contrast, second MOCA satellite 340 provides PNT data transmission over a high latitude area 342, thus providing PNT data transmission coverage that cannot be reached by GPS satellite 320. Furthermore, since the MOCA transceiver arrays on first and second MOCA satellites 330 and 340 allow changes in the directionality and modulation (e.g., in time, polarization, phase, and amplitude) of the transmitted light beam, areas 332, 334, and 342 can be modified during use, thus allowing additional flexibility in the PNT data transmission that cannot be achieved using traditional GPS satellites. Additionally, the divergence angle (i.e., beam width) of the light beam carrying the PNT data can be varied, allowing narrower or broader beams as desired.

Figure 4:
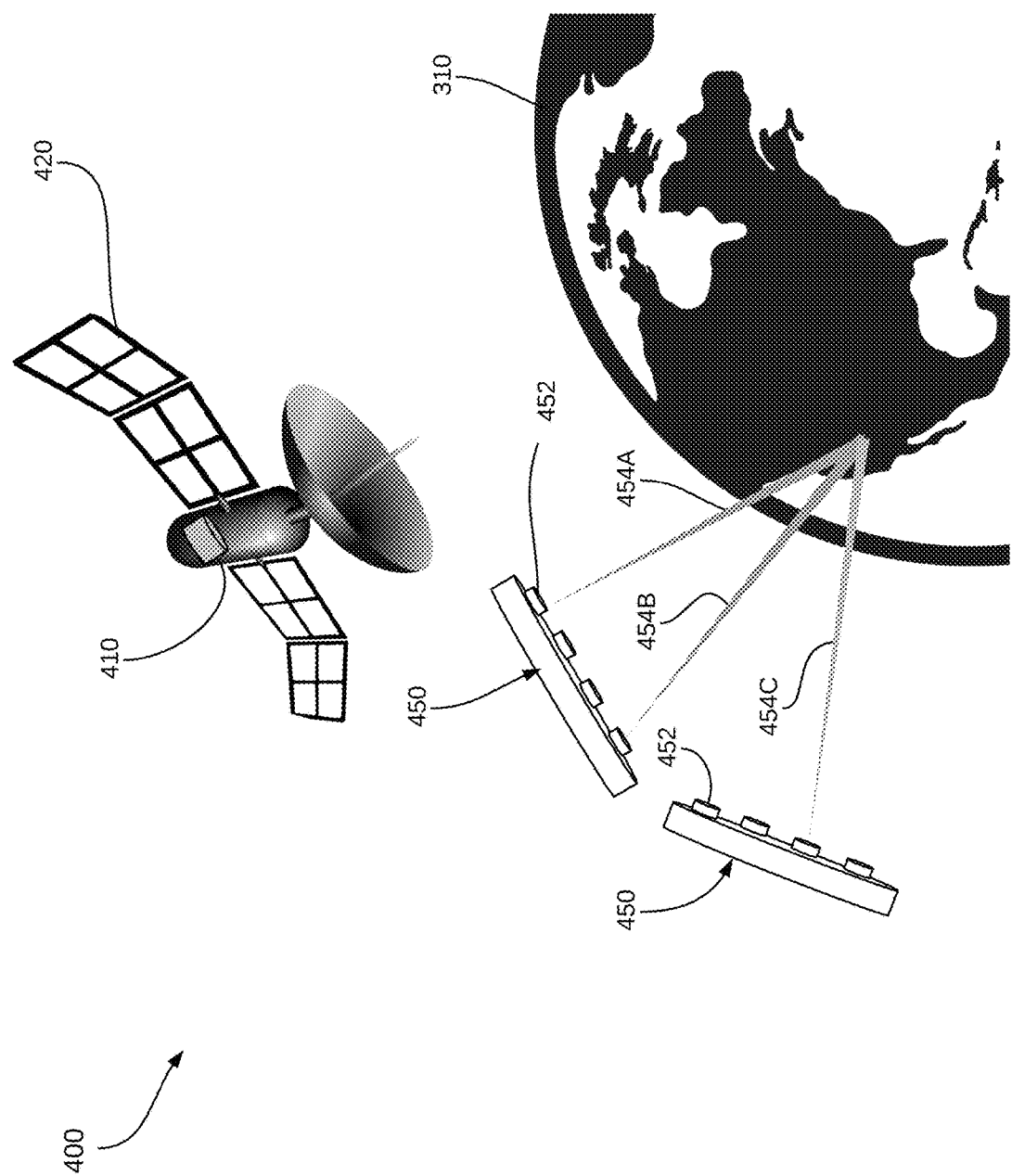
FIG. 4 shows an alternative OPNT system including a combination of RF and optical communication satellites, in accordance with an embodiment.

FIG. 4 shows another OPNT system 400, including a combination of RF-based PNT systems and MOCA satellites, in accordance with an embodiment. As previously discussed, a MOCA transceiver array can be provided on a dedicated satellite, as shown in FIG. 3, or can be provided as a payload on a host satellite. For example, as shown in FIG. 4, a MOCA transceiver array 410 can be hosted as a payload on a GPS satellite 420, thus providing additional capability to GPS satellite 420. In such a case, GPS satellite is capable of transmitting PNT data using the traditional RF channel, as well as in optical bandwidths using the MOCA transceiver array hosted thereon. It is noted that the MOCA transceiver-based PNT system may also be configured to operate in conjunction with other types of global navigation satellite systems, such as BeiDou/BDS (China), Galileo (Europe), GLONASS (Russia), IRNSS/NavIC (India), and QZSS (Japan).

Also shown in FIG. 4 are representations of MOCA transceiver arrays 450. Each MOCA transceiver array 450 includes multiple transceivers 452. By fine tuning and measuring the angular relationships between light rays transmitted from different transceivers 452, such as light rays 454A, 454B, and 454C, OPNT system 400 can further improve the accuracy of the PNT data transmitted to Earth 310 by multi-aperture interferometry. Moreover, additional information, such as the geometric orientation of the various components and transmission of the OPNT system and the molecular orientation angle of the liquid crystal switch used within each transceiver 452 and the satellite ephemeris, can be incorporated to the PNT data to further refine the accuracy of the PNT data.

Figure 5:
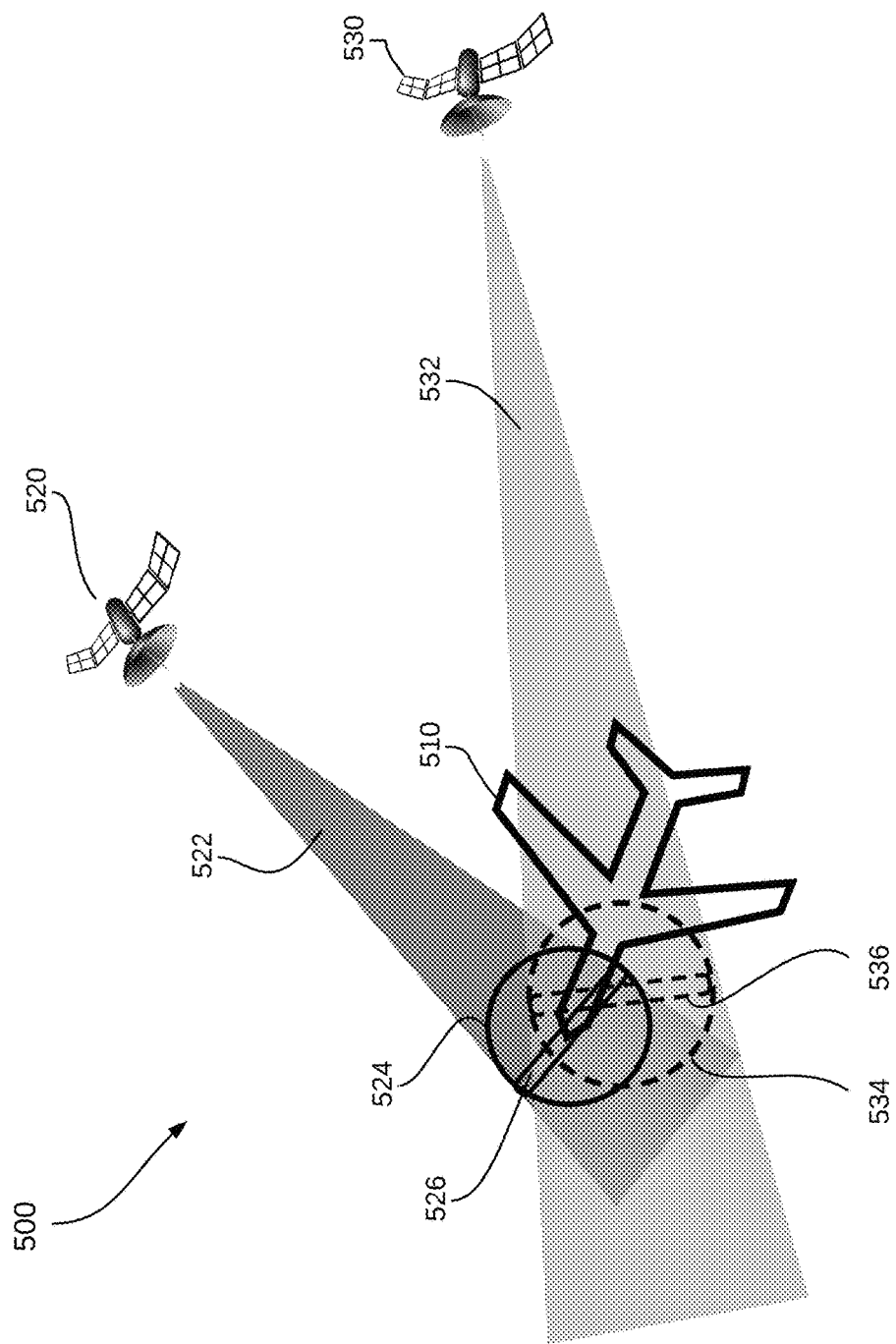
FIG. 5 shows still another OPNT system for providing enhanced positioning accuracy, in accordance with an embodiment.

FIG. 5 shows another application of an OPNT system 500 providing enhanced positioning accuracy, in accordance with an embodiment. As shown in FIG. 5, OPNT system 500 is configured for assisting with the PNT requirements of an aircraft 510. Alternatively, OPNT system 500 can be used with other mobile and/or stationary objects. OPNT system 500 includes a first MOCA satellite 520, emitting PNT data over a cone 522. Projected onto Earth, cone 522 is results in a circular area 524 with a radial distance 526. Normally with RF-based GPS, potential angle errors allow positioning volume precision on the order of cubic meters. However, when a second MOCA satellite 530, emitting PNT data over a cone 532 with a projected circular area 534 and radial distance 536, the overlap of the two volumes can result in positioning volume precision on the order of cubic millimeters through precise measurement of the overlapping radial distance. In fact, the timing tic marks in the optical PNT transmission is extremely tight (e.g., 10 psec), thus providing improved range accuracy and, slightly less so, positioning accuracy in the lateral dimensions. By combining two or more beams, as shown in FIG. 5, the error box for the position calculations can be much narrower than just by using the lateral/angular data from a single beam. Further, the error box can be further reduced by performing a long average on the position calculations. The width of cones 522 and 532 can be narrowed or broadened according to the needs of the specific application, thus allowing the user to adjust the required optical and processing bandwidth accordingly.

Continuing to refer to FIG. 5, various modifications to the MOCA satellite configuration can be made to further enhance the PNT data accuracy. For example, non-Gaussian modes (e.g., Laguerre-Gaussian or other modes) can be used to create illumination patterns beyond the overlapping radial distance shown in FIG. 5. Such modes can be produced at the MOCA transceivers within first and second MOCA satellites 520 and 530, respectively, using phase modulation components within the MOCA transceivers, such as using spatial light modulators and/or fixed phase plates. Additionally, wavelength variations across each beam cone can be used to encode information regarding color/wavelength as a function of angular position. Such wavelength variations can be achieved, for example, using a frequency modulator at the MOCA transceivers, or by mixing laser beams from adjacent transceivers in an optical train configuration. Additional optical signals, for example from additional MOCA satellites, can further enhance the precision of the location information provided. For example, using four light beams to provide the PNT data would yield a quadrature error signal, thus enabling higher precision location information. Further, superimposing modulations to the wavelengths of overlapping light beams produces beats and/or interference patterns, which can be used to provide even finer precision in the location information.

For example, when using a wider angle beam, the angular precision of the pointing is lower than if a narrower "pencil" beam directed at a single, specific user or a small group of users. However, by simultaneously sending a combination of wavelengths a weighted average calculation is possible to help define where in the wide beam the user is located.

Figure 6:
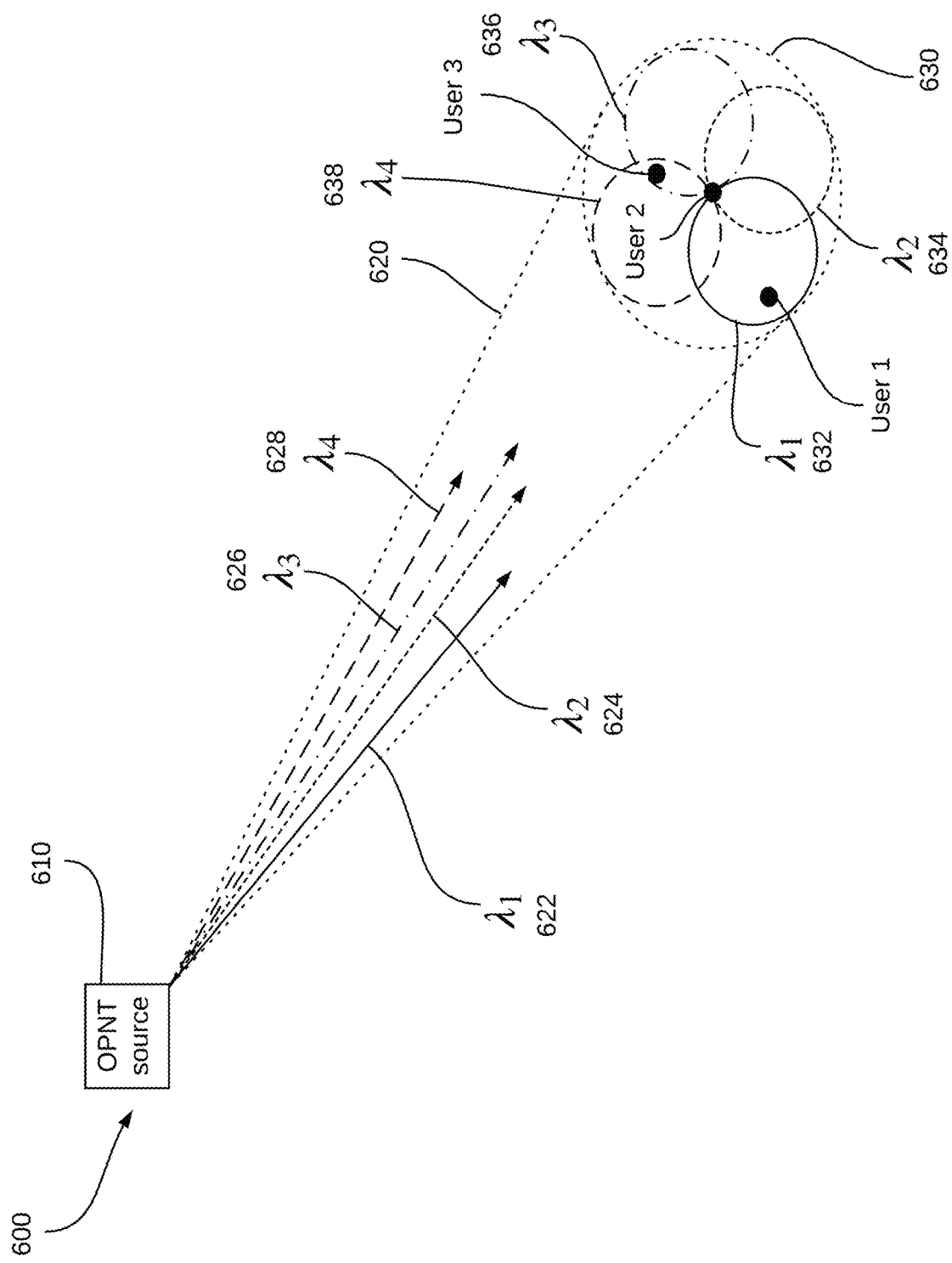
FIG. 6 illustrates a use case for an OPNT system, in accordance with an embodiment.

FIG. 6 illustrates a use case 600 for an OPNT system, in accordance with an embodiment. As shown in FIG. 6, an OPNT source 610 transmits PNT data (represented by a dashed cone 620) toward users 1, 2, and 3. OPNT source 610 incorporates one or more MOCA transceiver arrays, such as in the embodiments illustrated in FIGS. 3-6. In the example illustrated in FIG. 6, OPNT source 610 transmit at a variety of wavelengths (as represented by arrows 622, 624, 626, and 628) containing wavelength-specific PNT data. PNT data 620 results in a footprint 630, while the wavelength-specific PNT data result in smaller footprints 632, 634, 636, and 638 corresponding to wavelength-specific PNT data 622, 624, 626, and 628, respectively. As shown in FIG. 6, User 1 is located within footprint 632 corresponding to a first wavelength. Thus, User 1 receives only wavelength-specific PNT data 622. User 2 is located at the intersection of all four wavelength footprints as shown, therefore receives a combination of PNT data from all four wavelengths. Similarly, User 3 is located at an intersection of the footprints corresponding to the third and fourth wavelengths, thus receives a combination of PNT data from the third and fourth wavelengths. Thus, each user receives a combination of wavelengths with a unique wavelength combination signature for a specific location. By setting the wavelength, location, footprint size, and other parameters of the PNT data transmission from the OPNT source, the OPNT system can customize the actual PNT data received by a given user at a specific location, for example. Conversely, by calculating a weighted average of the wavelengths received by a given user, it is also possible to determine the location of the user within the larger footprint 620.

Figure 7:
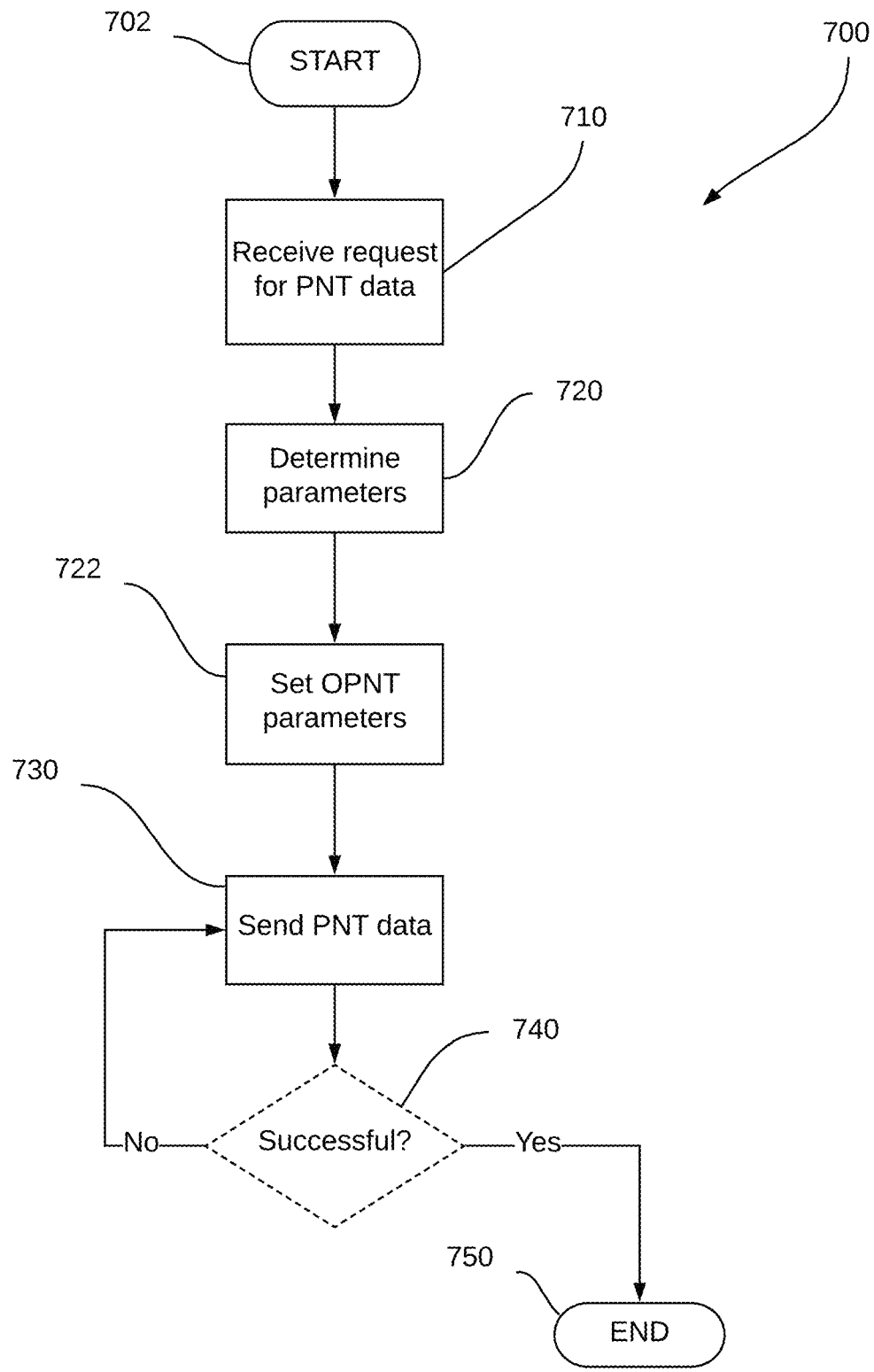
FIG. 7 illustrates a method of use for an OPNT system, in accordance with an embodiment.

FIG. 7 illustrates a method 700 for using an OPNT system, in accordance with an embodiment. The OPNT system suitable for use with method 700 is, for example, those shown in FIGS. 3-6. As shown in FIG. 7, method 700 begins with a start step 702, then a step 710 in which a request for PNT data is received at the OPNT system. At the OPNT system, the relevant parameters for the PNT data transmission is determined in a step 720. The parameters can include various parameters for the PNT data transmission such as, for example, wavelength, timing, phase, directionality, and size of the light beam to be transmitted. Specifically for OPNT systems based on MOCA transceiver arrays, additional parameters, such as the number of transceivers within the array that will be used to transmit the PNT data, can also be determined in step 720.

Continuing to refer to FIG. 7, once the parameters have been determined in step 720, the parameters are used to set the OPNT system in a step 722, then the PNT data is sent in a step 730. An optional determination is made in a decision 740 to determine whether the PNT data has been successfully received at the intended target. This determination is made, for example, by receiving an acknowledgment signal from the receiver of the PNT data such that the OPNT system operates as a two-way system. Alternatively, no determination is made (i.e., the PNT data transmission is one-way only). Finally, process 700 is terminated in an end step 750.

It is emphasized that the use of FSOC for providing PNT data yields significant advantages over the tradition RF-based GPS. For instance, with FSOC, only one data source (e.g., satellite) is required to determine positioning information, without the requirements of GPS for triangulation from multiple satellites with known location and time bases. Since triangulation time is not required, the time required to establish location (e.g., via cold or warm start) using FSOC is limited to the time required to establish the FSOC communication link only. The use of overlapping FSOC PNT signals allows increased precision in PNT data at the receiving terminal. Also, FSOC PNT systems are less prone to interference by, for example, jammers. Due to the flexibility provided by the MOCA transceiver arrays, MOCA-based FSOC PNT systems can be dynamically configured to provide PNT data over a wide area or to specific users. For example, for commercial use, a broad beam can be used to provide PNT data to a large group of users. For military use, for example, a narrow beam can be used to transmit PNT information to a specific group of users or even to individuals. Even when PNT data is to be provided over a large area, methods such as Time Division Multiple Access (TDMA) can be used to further increase the number of users serviced by the FSOC PNT while still securing the transmitted data. Moreover, FSOC PNT systems can provide additional security by enabling encryption of the transmitted optical data. Since the amount of information transmitted in a PNT data transmission is much lower than when optical signals are used for larger volume data transmission, the bandwidth and data volume requirements for an FSOC PNT system is low, and much lower data rates can be used for the PNT data transmission.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention.

Accordingly, many different embodiments stem from the above description and the drawings. It will be understood that it would be unduly repetitious and obfuscating to literally describe and illustrate every combination and sub-combination of these embodiments. As such, the present specification, including the drawings, shall be construed to constitute a complete written description of all combinations and subcombinations of the embodiments described herein, and of the manner and process of making and using them, and shall support claims to any such combination or sub-combination.

In the specification, there have been disclosed embodiments of the invention and, although specific terms are employed, they are used in a generic and descriptive sense only and not for purposes of limitation. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. An optical positioning-navigation-timing (PNT) system, comprising:
   a managed optical communications array (MOCA) transceiver,
   the MOCA transceiver including an array of optical transceivers for transmitting and receiving optical signals, each optical transceiver including a laser and a beam steering element, and a controller for controlling the operation of the array of optical transceivers,
   wherein each optical transceiver of the array of optical transceivers is adjustable for optical parameters of the optical signals so transmitted and received, the optical parameters including at least one of phase, angle, wavelength, time delay, amplitude, pulse delay, polarization, timing offset, phase, and divergence angle,
   wherein the controller is configured for controlling the optical parameters to include PNT data in a portion of the optical signal transmitted from the MOCA transceiver, and
   wherein the optical PNT system is hosted as a payload on a satellite.

2. The optical PNT system of claim 1, further comprising a mounting mechanism for mounting the MOCA transceiver on at least one of a ground station, a ground vehicle, an aircraft, a marine vessel, and a satellite.

3. The optical PNT system of claim 1, wherein the satellite is one of a Global Positioning System (GPS) satellite, a BeiDou satellite, a Galileo satellite, a GLONASS satellite, an IRNSS/NavIC satellite, and a QZSS satellite.

4. A method for using an optical positioning-navigation-timing (PNT) system, the method comprising:
   providing an optical PNT system including a managed optical communications array (MOCA) transceiver, at the optical PNT system, receiving a request for PNT data from a requester, determining parameters for an optical signal containing the PNT data, and using the MOCA transceiver, sending the optical signal containing the PNT data to the requester.

5. The method of claim 4, further comprising:

in the optical signal, including instructions to return a confirmation to the optical PNT system when the optical signal containing the PNT data at the requester.

6. The method of claim 4, wherein sending the optical signal containing the PNT data includes sending multiple optical signals toward the requester, the multiple optical signals differing from each other in at least one of phase, angle, wavelength, time delay, amplitude, pulse delay, polarization, timing offset, phase, and divergence angle.

* * * * *